United States Patent [19]
Schwirtlich et al.

[11] Patent Number: 4,877,596
[45] Date of Patent: Oct. 31, 1989

[54] PROCESS FOR THE PRODUCTION OF LOW CARBON SILICON

[75] Inventors: Ingo Schwirtlich; Peter Woditsch; Wolfgang Koch, all of Krefeld, Fed. Rep. of Germany

[73] Assignee: Bayer Aktiengesellschaft, Leverkusen, Fed. Rep. of Germany

[21] Appl. No.: 80,879

[22] Filed: Aug. 3, 1987

[30] Foreign Application Priority Data

Aug. 14, 1986 [DE] Fed. Rep. of Germany ....... 3627624

[51] Int. Cl.⁴ .............................................. C01B 33/02
[52] U.S. Cl. ............................ 423/348; 156/DIG. 64; 423/345; 423/349
[58] Field of Search ....................... 423/348, 345, 349; 156/64

[56] References Cited

U.S. PATENT DOCUMENTS

| 2,402,582 | 6/1946 | Scaff | 423/266 |
| 3,671,229 | 6/1972 | Ferber et al. | 75/63 |
| 4,242,307 | 12/1980 | Fally | 422/194 |
| 4,388,286 | 6/1983 | Kapur et al. | 423/348 |

FOREIGN PATENT DOCUMENTS

| 0085129 | 5/1979 | Australia . | |
| 2292613 | 12/1987 | Japan | 423/349 |
| 590458 | 7/1947 | United Kingdom | 423/348 |

Primary Examiner—John Doll
Assistant Examiner—Lori S. Freeman
Attorney, Agent, or Firm—Connolly & Hutz

[57] ABSTRACT

Silicon having a low carbon content is produced by removing carbon from molten silicon by heating the molten silicon to temperatures of 1420° to 1900° C. and establishing a temperature gradient of 30° to 400+ K. in the melt.

7 Claims, No Drawings

PROCESS FOR THE PRODUCTION OF LOW CARBON SILICON

This invention relates to a process for the production of low carbon silicon from molten silicon. The invention also relates to the low carbon silicon obtainable by this process.

BACKGROUND OF THE INVENTION

Silicon is obtained mainly by carbothermal reduction of silicon dioxide in an arc furnace. The product obtained, so-called metallurgical silicon, contains 96 to 99% by weight of silicon and various impurities consisting mainly of the elements aluminium, iron, boron, phosphorus and carbon and compounds of these elements.

Large quantities of inexpensive silicon are required for use in photovoltaic processes.

This silicon, so-called silicon of solar quality, must satisfy certain standards of purity (see J. Dietl, D. Helmreich, and E. Sirtl; Solar Silicon, in J. Grabmaier (publishers): Crystals, Growth, Properties, Applications, Vol. 5, page 45, Berlin-Heidelberg-New York, Springer 1981).

No process has so far become known by which metallurgical silicon can be purified to the required degree in a single step. It has always required a multistage process of purification.

The metal impurities may be removed by an acid treatment according to U.S. Pat. No. 2,402,839, and the phosphorus content can be reduced to the required concentrations by a vacuum treatment. However, the carbon content is difficult to reduce to the required low concentrations and the necessary reduction of the boron content is virtually impossible.

Metallurgical silicon having a degree of purity of about 98% generally contains 700 to 1500 ppma of carbon (ppma =atoms of carbon per 1 million atoms of silicon).

This concentration is far above the tolerance limit permissible for use in photovoltaics. It is therefore absolutely necessary to reduce the carbon content.

Published European Application 137,306 reports on the removal of carbon from solid silicon fragments by treating the fragments with aqueous nitrate solution and annealing at 1000° to 1100° C.

This process, however, is unable to reduce the carbon content sufficiently.

German Pat. No. 3,403,131 describes a process for the removal of unreduced quartz and unreacted carbon from silicon produced in an arc furnace by melting the silicon in a graphite or quartz crucible. The unreduced quartz and unreacted carbon collect on the wall of the crucible and remain there when the silicon is poured off. Even this process, however, cannot provide the necessary degree of purity.

German Pat. No. 3,416,559 describes a process in which the silicon carbide and silicon dioxide particles present in molten silicon are mechanically removed by centrifuging, but this process is very expensive.

It is an object of the present invention to provide a process for the preparation of low carbon silicon from molten silicon which is free from the disadvantages described above.

BRIEF DESCRIPTION OF THE INVENTION

It has now surprisingly been found that low carbon silicon can be obtained by heating the silicon to temperatures of 1420° to 1900° C. and establishing a temperature gradient in the melt.

It has been found most suitable to produce a temperature gradient ranging from 30 to 400K.

DETAILED DESCRIPTION

The present invention thus relates to a process for the preparation of low carbon silicon from molten silicon, characterised in that the silicon is heated to temperatures of 1420° to 1900° C. and a temperature gradient of 30 to 400K is established in the melt. The temperature gradient is preferably from 30 to 200K.

The temperature gradient may be established by cooling the lower region of the vessel in which the silicon is melted. The temperature gradient is preferably established by cooling the bottom of the melting vessel to a temperature in the region of 1420° to 1500° C. In one variation of the process according to the invention, the melting vessel is heated by resistance heating and then lowered so that the bottom of the vessel is below the lowest heating zone.

The temperature of the cool region of the melting vessel should not fall below the melting point of silicon as the silicon might otherwise crystallize.

In one particularly preferred variation of the process, one or more seed crystals, preferably of silicon carbide, are placed on the inside of the cooled bottom of the melting vessel. These seed crystals assist the growth of silicon carbide crystals from the melt.

It is advantageous to keep the silicon carbide crystals at a temperature in the region of 1420° to 1500° C. since crystallization of silicon may occur at temperatures below this range, as already mentioned.

In another preferred embodiment of the process, the silicon melt is kept in a vacuum or under inert gas to minimize the introduction of impurities into the melt and unwanted reactions of the silicon with atmospheric constituents.

The inert gas used is preferably argon.

When graphite crucibles are used, the carbon content can rapidly and economically be reduced to the limit of solubility in the molten silicon.

By using melting vessels made of refractory ceramics such as silicon nitride or, with some reservations, also quartz, the carbon content can also be reduced to below the limit of solubility in molten silicon.

This invention further relates to a low carbon silicon obtainable by the process according to the invention.

This low carbon silicon characteristically has a carbon content in the range of from 60 to 95 ppma while the amounts of other impurities are generally not reduced by the process according to the invention.

The process according to the invention will now be described in more detail with the aid of examples.

EXAMPLE 1

Silicon having a carbon content of 1500 ppma was melted in a graphite crucible capable of holding 2 kg and having a vacuum apparatus attached. The crucible was surrounded by an insulating mat of graphite felt 10 mm in thickness. At the centre of the bottom of the crucible, this insulation was omitted over a circular area with a diameter of 40 mm to enable the bottom of the crucible to radiate its heat into the vacuum apparatus which had water-cooled walls. The crucible was heated by activation at a medium frequency so that a temperature of 1420° C. was established in the cooled area of the bottom. Under these conditions, the temperature at the top edge of the crucible was about 1600° C. After the crucible had been kept in a vacuum for 2 hours, the melt was poured off. When the apparatus was opened after it had been cooled, a heap of small crystals was found to have accumulated in a circular area at the bottom of the crucible over the diameter of the cooled area. On investigation, these crystals were found to be silicon carbide crystals. When the silicon which had been poured off was analysed, it was found to have a carbon content of 93 ppma.

EXAMPLE 2

Silicon having a carbon content of 1500 ppma was treated under the conditions described in Example 1. The crucible was similar to that used in Example 1 but in this case a few small silicon carbon crystals were placed in the cooled area. After termination of the experiment, it was found that the silicon carbide crystals introduced had undergone a marked increase in size. The carbon content was reduced to 90 ppma.

EXAMPLE 3

Silicon placed in a silicon nitride crucible having a capacity of 500 g was melted over a resistance heating under an argon atmosphere. In this experimental arrangement, the crucible could be moved upwards and downwards.

When the whole batch of silicon had melted, the crucible was lowered until the bottom of the crucible was below the lowermost heating zone. The position was adjusted so that a temperature of 1420° C. was established at the bottom of the crucible. The upper part of the crucible was at a temperature of 1550° C. After the crucible had been kept in position for 8 hours, it was slowly lowered so that the melt solidified from below upwards. After the solidified block had been cooled and the crucible removed, the bottom of the crucible was found to contain several greenish SiC crystals which had grown in the cooled region. In this experiment, the carbon content of the silicon was reduced from 826 ppma to 63 ppma which is below the limit of solubility in molten silicon.

What is claimed is:

1. Process for the removal of carbon from molten silicon which comprises first heating the molten silicon in a vessel to temperatures of 1420° to 1900° C. and establishing a temperature gradient of 30 to 400° K in the melt, wherein the temperature gradient is established by cooling the bottom of the vessel containing the molten silicon to a temperature in the range of 1420° to 1500° C., then removing the melt from the vessel to produce silicon having a carbon content of from 60 to 95 atoms per million silicon atoms.

2. Process according to claim 1 wherein the temperature gradient through the melt is 30 to 200° K.

3. Process according to claim 1 wherein one or more seed crystals of silicon carbide are on the inside of the cooled bottom of the vessel containing the molten silicon.

4. Process according to claim 3 wherein the silicon carbide seed crystals are maintained at a temperature in the region of 1420° to 1500° C.

5. Process according to claim 1 wherein the molten silicon is under a vacuum or under inert gas.

6. Process according to claim 5 wherein the silicon melt is under a vacuum of $10^{-3}$ to $10^{-6}$ mbar.

7. Process according to claim 5 wherein the molten silicon is under the inert gas argon.

* * * * *